United States Patent
Stephens

(10) Patent No.: US 7,663,976 B2
(45) Date of Patent: Feb. 16, 2010

(54) DYNAMIC POSITIONING OF MARINE VESSELS

(75) Inventor: Richard Ian Stephens, Warwickshire (GB)

(73) Assignee: Converteam UK Ltd., Warwickshire (GB)

( * ) Notice: Subject to any disclaimer, the term of this patent is extended or adjusted under 35 U.S.C. 154(b) by 359 days.

(21) Appl. No.: 11/710,764

(22) Filed: Feb. 26, 2007

(65) Prior Publication Data

US 2007/0233389 A1    Oct. 4, 2007

(30) Foreign Application Priority Data

Mar. 1, 2006    (GB) .................... 0604205.5

(51) Int. Cl.
*G01V 1/40* (2006.01)
(52) U.S. Cl. .................................... 367/128
(58) Field of Classification Search ............ 367/128; 702/6
See application file for complete search history.

(56) References Cited

U.S. PATENT DOCUMENTS

| | | | |
|---|---|---|---|
| 4,012,919 A | 3/1977 | Rosa et al. | |
| 4,317,174 A | 2/1982 | Dean | |
| 5,978,739 A | 11/1999 | Stockton | |
| 2007/0233389 A1* | 10/2007 | Stephens | 702/6 |

FOREIGN PATENT DOCUMENTS

| | | | |
|---|---|---|---|
| GB | 1508624 | | 3/1982 |
| GB | 2083220 | | 3/1982 |
| GB | 2435692 A | * | 9/2007 |
| WO | WO81/02442 | | 9/1981 |

OTHER PUBLICATIONS

Stephens, R. I., Meahan, A. J. and Flint, J. C.: "Using Doppler logs for safer DP", Nov. 2005, pp. 1-9.*
UK Patent Office Search Report for GB Application No. 0604205.5, date of search Jun. 27, 2006 (1 page).

* cited by examiner

*Primary Examiner*—Dan Pihulic
(74) *Attorney, Agent, or Firm*—Schwegman, Lundberg & Woessner, P.A.

(57) ABSTRACT

Dynamic positioning of a vessel 10 connected to the seafloor 14 by a riser 12 utilizes a measurement of riser 12 bottom angle combined with a measurement of vessel 10 velocity, optionally obtained from a Doppler log 16. These two signals are combined to produce a single position estimate using an algorithm such as a Kalman filter. Using riser bottom angle only would result in an unstable control system, since the bottom angle lags the vessel motion by a considerable amount and the relationship is non-linear. Using the velocity measurement alone would result in a slow drift of position. The combination of the two eliminates the disadvantages of the individual measurements.

12 Claims, 2 Drawing Sheets

DYNAMIC POSITIONING OF MARINE VESSELS

RELATED APPLICATION

This application claims priority under 35 U.S.C. 119 to United Kingdom Application No. 0604205.5, filed Mar. 1, 2006, which application is incorporated herein by reference and made a part hereof.

FIELD OF THE INVENTION

The invention relates to the dynamic positioning (DP) of marine vessels, i.e. the use of thrusters to maintain the position of a vessel in the vicinity of a reference point and stabilise its heading, in opposition to environmental forces such as wind and current.

The term "vessels" is intended to include ships, drilling rigs and any other surface-going vessels or platforms. The invention is principally relevant to applications in deep water but the use herein of the word "marine" is not intended to exclude its application in freshwater lakes.

BACKGROUND OF THE INVENTION

A ship moves in six axes, three translational (surge, sway and heave) and three rotational (roll, pitch and yaw). These six axes are shown in FIG. 1. A DP system for a surface vessel usually controls only the three movements in the horizontal plane, namely surge, sway and yaw, but it may need to take into account measurements on all six axes.

The fundamental components of a DP system are: one or more position reference systems to measure the vessel position and heading; thrusters to apply control action; and a controller to determine the required thrusts. The object of a DP system is not to hold the vessel absolutely stationary, but to maintain its station within acceptable limits. The magnitude of the permitted position variation is dependent upon the application and on operational concerns. In many applications a loss of position beyond the acceptable limits may have a severe impact either on the safety of personnel or equipment, or on the environment. It is vital, therefore, that adequate measures are taken to maintain the integrity of the DP system as far as is reasonably possible.

Safe operation in DP relies upon measurement of the vessel position and heading at all times. In order to ensure that this is true, even under fault conditions, all measurement systems include redundancy. Physical redundancy requires the replication of equipment to ensure that a single failure of any piece of equipment will not result in complete failure of the overall system and allows faulty equipment to be by-passed using the redundant hardware. The parallel redundant systems must be independent—i.e. no single failure mode should be capable of disabling the overall system. For measurement of heading this independence can be achieved by installing multiple gyrocompasses, since no failure of an individual unit will affect the others.

Whilst the gyrocompass offers a compact, reliable and accurate measurement of vessel heading (yaw), independent of outside disturbances, the measurement of position in surge and sway has proved to be more complex.

The provision of independent position measurements depends upon the location and operation of the vessel. For stationary operation in water depths up to about 1000 m multiple taut-wire systems provide independent redundant feedback of vessel position. No single failure can disable all the taut-wires. However, for many vessels, taut-wire is not an option; for example, drilling vessels have to operate in increasingly deep water.

Acoustic position measuring equipment (PME) systems suffer from a number of disadvantages. In deep water their measurements can be noisy and the interval between measurements increases, leading to loss of positioning accuracy. Multiple acoustic systems cannot be considered independent of each other since they all rely on the integrity of the same medium—the water. Deployment and recovery of acoustic beacons are an unavoidable burden on fast turn-around times.

The global positioning system (GPS) and differential GPS (DGPS) now dominate the position measurement market due to their cost, convenience, accuracy and size. They do, however, share a single mode of failure: ionospheric perturbations, particularly in tropical regions, have resulted in complete loss of GPS measurements for significant periods.

One function of a DP controller is to combine all available measurements of position, from whatever source, into a single estimate of ship position. The algorithm for combining the measurements can be based on a Kalman filter. The sources of measurements have included a wide variety of devices, including satellite navigation systems, hydroacoustic reference systems and taut wire systems. Recently, the use of velocity measurements as a supplementary measurement has been proven. (Stephens, R. I., Meahan, A. J. and Flint, J. C.: "Using Doppler logs for safer DP", *OSV Singapore* 2005, *jointly organised by Joint Branch of RINA-IMarEST Singapore and CORE*, 20-21 Sep. 2005.) Doppler logs are relatively cheap and compact. They operate by measuring the Doppler shift of high-frequency acoustic signals reflected either from the sea-bed (known as "bottom lock") to derive the vessel's speed relative to the sea bed; or from particles in the water below the keel (known as "water lock") to derive the vessel's speed relative to the surrounding water.

Suitable velocity measurements can be obtained from Doppler effect devices mounted beneath the vessel. Velocity measurements alone, however, cannot form a permanent position reference due to the drift in position resulting from the integration of errors in the velocity measurements. Therefore, some other form of position measurement is also necessary.

Risers are long pipes or rods which are used extensively in the oil and gas exploration and production industries. They are used for drilling and for extraction. Risers can be rigid or flexible. Normally, the positioning requirement of vessels with risers is related to maintaining the vessel position relative to the bottom of the riser. Attempts have been made at using information from risers to give a position measurement for use in DP. However, the disadvantages include the unknown shape of the riser string as it hangs in the water, since it is affected by water currents which can change and which are different at different depths. One proposal uses measurement of top and bottom riser angles coupled with measurement of water currents in an attempt to model the exact shape of the riser and the profile of currents from sea bed to surface. (Eger, P. O.: "The advantages of riser information to DP drilling units", *Proceedings of the* 2001 *IMCA Marine Division Annual Seminar & Workshops,* 13-14 Sep. 2001, Stavanger, Norway, pp. 55-57.)

SUMMARY OF THE INVENTION

The invention provides a method of determining the position of a vessel as defined in claim 1. Preferred but not essential features of that method are defined in claims 2 to 6.

The invention further provides a method of using the determined position to dynamically position a vessel, as defined in claim 7. Preferred but not essential features of that method are defined in claim 8.

Finally, the invention provides apparatus for determining the position of a vessel as defined in claim 9. Preferred but not essential features of that method are defined in claims 10 and 11.

The current invention utilises a measurement of riser bottom angle combined with a measurement of vessel velocity, possibly, but not exclusively, obtained from a Doppler log. These two signals are combined to produce a single position estimate, possibly using a Kalman filter or some other algorithm. The combined position estimate retains the advantages of each of the signals, i.e. the riser bottom angle gives a slow estimate of the vessel required position whilst the velocity measurement gives a fast measurement of motion. This allows the DP system to maintain the position of the vessel within the required limits for long periods in a stable manner.

Using a riser bottom angle only would result in an unstable control system, since the bottom angle lags the vessel motion by a considerable amount and the relationship is non-linear. Using the velocity measurement alone would result in a slow drift of position. The combination of the two eliminates the disadvantages of the individual measurements.

For combining the bottom angle and velocity measurements, a Kalman filter is not the only possible algorithm. Any state observer could work, e.g. a Wiener filter or Luenberger observer. One could also theoretically use a simple mixing algorithm using a high-pass filter on the velocities and a low-pass filter on the riser angles.

The invention allows a reliable and stable estimate of vessel position to be obtained without measuring the top angle of the riser and in particular without the need to model the exact shape of the riser and the profile of currents from sea bed to surface.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENT

Figure 1:
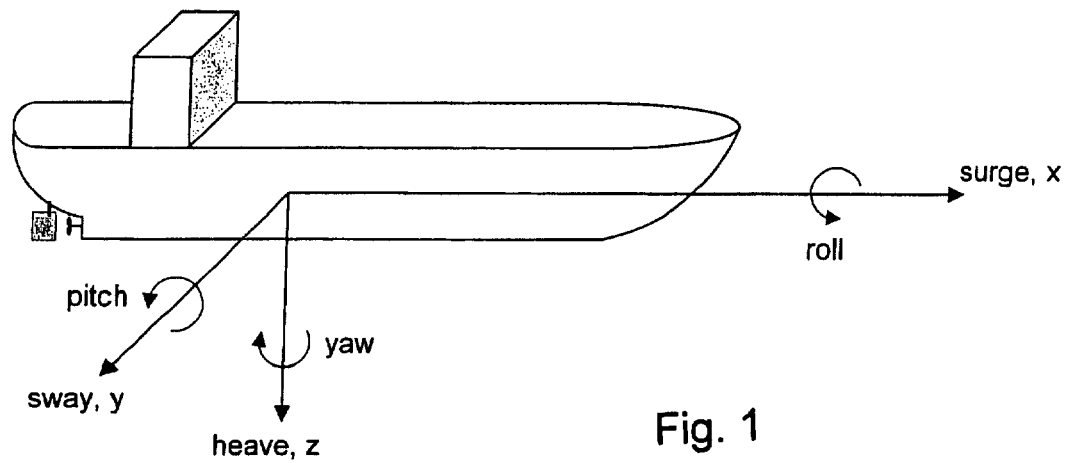
FIG. 1 is a diagram of the six axes of motion of a vessel.

A preferred embodiment of the invention uses a Kalman filter (KF) to combine measurements of vessel velocity, vessel heading and riser bottom angle with any other position measurements that may be available in order to estimate the vessel's position and heading and dynamically control them.

Basic Kalman Filter Equations

The basic KF equations (see, for example, Åström and Wittenmark, *Computer Controlled Systems: Theory and Design, 2nd Edition*, Prentice-Hall International, Englewood-Cliffs, N.J., USA, 1990) are based on a discrete state space model of the ship as follows:

$$x(t+\tau)=\Phi x(t)+\Gamma u(t)+w(t) \quad (1)$$

$$y(t)=Hx(t)+v(t) \quad (2)$$

where x(t) is the state vector at time t, u is a vector of control inputs and feed-forward forces, y is a vector of measured outputs, $\tau$ is the sampling period whilst $\Phi$, $\Gamma$ and H are matrices defining the transitions of the state vector. w and v are noise processes acting on the states and the output respectively. w and v are assumed to be Gaussian with zero mean.

The KF method is based on a cycle of prediction followed by correction. At each time step the following equations, based on the model equations (1) and (2) above, are used to extrapolate the state x forward and generate a prediction of y.

$$\hat{x}^*(t+\tau)=\Phi\hat{x}(t)+\Gamma u(t) \quad (3)$$

$$\hat{y}(t)=H\hat{x}^*(t) \quad (4)$$

where $\hat{x}$ and $\hat{y}$ are the estimated state and measurement vectors respectively. $\hat{x}^*$ is an intermediate state vector following the extrapolation. When a measurement of position is available, the predicted position, $\hat{y}$, is compared with the measurement and the states corrected as follows:

$$e(t)=y(t)-\hat{y}(t) \quad (5)$$

$$\hat{x}(t)=\hat{x}^*(t)+L(t)e(t) \quad (6)$$

e is a vector of errors between the measurements and estimates. L is a matrix of update gains (usually known as "Kalman gains") which may be time varying.

The formulation of the above equations allows for vectors of inputs, u, and measurements, y, so that it is straightforward to include a number of measurements from different measuring equipment. This, therefore, provides a mechanism for including both riser angle and velocity measurements into the Kalman filter. The measurement vector, y, and error vector, e, are extended to include all available measurements. The measurement transition matrix, H, must have rows added to form an estimated velocity output and riser bottom angle, whilst the Kalman gain matrix, L, requires extra columns for the new measurements.

The model also includes extra states within $\hat{x}$ in order to account for the dynamics of the measuring instruments, requiring augmentation of $\Phi$, $\tau$, H and L.

Drift Estimation

A Doppler log in water lock is likely to be affected by a current or tide. If no other PMEs were available this would lead to a drift in the estimated position proportional to elapsed time. In order to correct for this source of error, an offset on the velocity measurement must be modelled and estimated within the system.

In order to estimate the drift one of two methods can be employed. The first is to augment the KF state vector, x, to include a drift term for each Doppler log on the vessel. The KF model matrices $\Phi$, $\Gamma$ and H must also be extended. The Kalman gain matrix, L, requires recalculating as well, the tuning of which is critical to ensure that the drift estimation is performed in a satisfactory manner. The alternative method of drift estimation is to form a separate estimator, which compares measured and estimated velocities.

Figure 2:
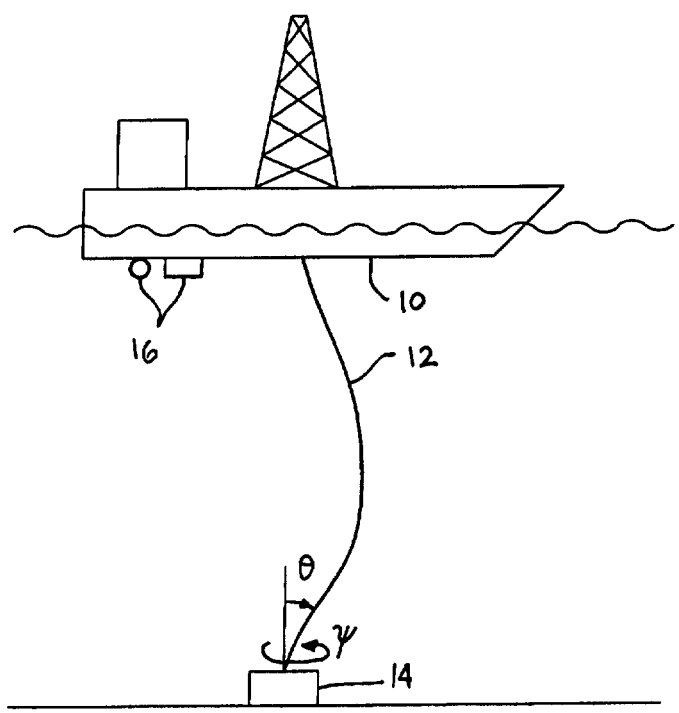
FIG. 2 shows schematically the measurement of riser angle used in the invention.

FIG. 2 shows schematically the measurement of riser angle used in the invention. A vessel 10 is connected by a riser 12 to a fixed point 14 on the sea floor. The riser 12 may be a pipe and the fixed point may be the blow-out preventer of a well head. Alternatively, riser 12 may simply be a cable connected to a sea floor anchor 14.

The vessel 10 carries Doppler logs, shown schematically at 16, which are oriented in the surge and sway directions and operate in water lock to measure the velocity of the vessel 10 relative to the water within a range of a few meters below the hull of the vessel.

The connection of the riser 12 to the fixed point 14 on the sea floor carries sensors (not shown) for measuring the orientation of the riser 12 at the fixed point. Although this specification generally refers to simply the riser bottom angle, full measurement of the orientation requires the measurement of two angles. In one example, the pair of angles comprises the polar angle $\theta$ by which the riser 12 deviates from the vertical and the azimuthal angle $\psi$ which defines the bearing of a vertical plane that contains the bottom of the riser 12. An alternative and preferred pair of angles comprises the deviations of the bottom of the riser 12 from two mutually perpendicular planes defined relative to the fixed point 14. Another alternative would be the x,y co-ordinates of a given point near the bottom of the riser in a co-ordinate system defined relative to the fixed point 14.

Whichever pair of measurements is used, they are converted from a co-ordinate system defined relative to the fixed point 14 to a co-ordinate system defined relative to the Earth (for example with axes aligned East, North and Up). Then, knowing the depth of the water, the riser bottom angle measurements can be converted to a ship position (direction and distance from the point on the surface above the fixed point 14) which is fed into the Kalman filter as described above. Alternatively, the Kalman filter could be set up to accept the raw angle measurements, without prior conversion. There, the bottom angle measurements are combined with the velocity measurements and any other available position measurements such as GPS in a common set of co-ordinates referenced e.g. to the surge and sway directions of the vessel or to latitude and longitude.

Figure 3:
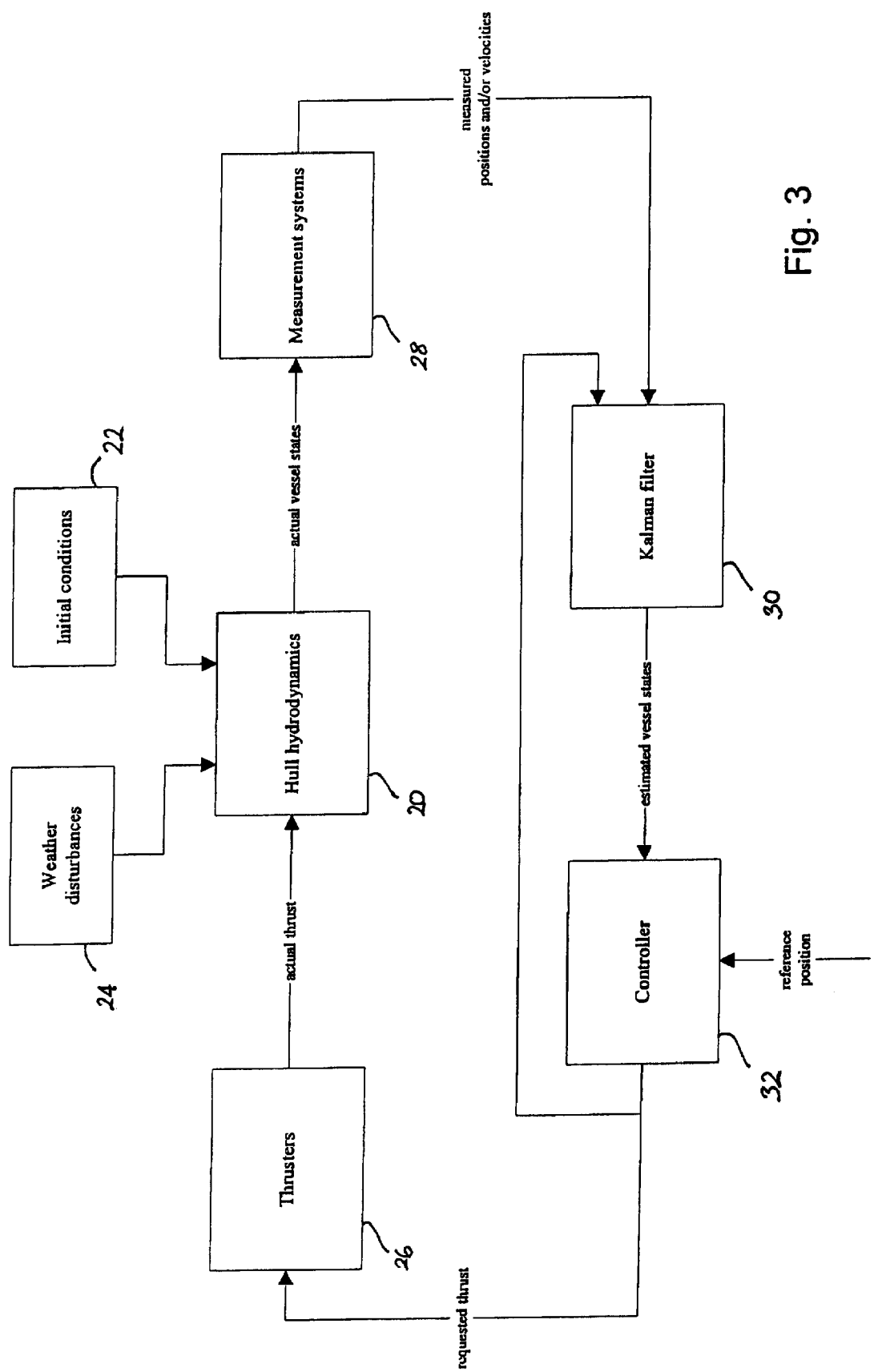
FIG. 3 is a block diagram of a dynamic positioning control scheme for a single axis of motion of a vessel, in accordance with the invention.

A block diagram of a typical control scheme for a single axis of motion of the vessel is shown in FIG. 3. Each axis of motion has its own Kalman filter, which is largely independent of the others.

The hydrodynamics of the hull are represented by box 20. The motion of the vessel in the absence of control is determined by the initial conditions 22 (position, heading, velocity) and by environmental influences 24 (principally wind and current). The control of the vessel is provided by thrusters 26, which act on the hull together with the other influences 22,24 to change the actual states of the vessel.

Measurement systems 28, including the Doppler logs 16 and riser 12 bottom angle measurement previously described, sample the actual vessel states at predetermined time intervals to provide measured positions and/or velocities that are fed into the Kalman filter 30 to determine the measurement vector y. The Kalman filter 30 combines the actual measurement vector y with its predicted measurement vector ŷ to update its model of the motion of the vessel and output a prediction of the actual vessel states to a controller 32.

The controller 32 compares the actual position and heading of the vessel predicted by the Kalman filter 30 with a reference position, i.e. generally the position on the surface that is directly above the reference point 14 on the seabed. As a result of the comparison, the controller outputs a signal to the thrusters 26 to cause them to bring the position of the vessel 10 closer to the desired reference position. The output signal from the controller 32 is also fed back to the Kalman filter 30 as input vector u so that the predicted effect of operating the thrusters can be taken into account by the model during the succeeding time interval.

What is claimed is:

1. A method of determining the position of a vessel on the surface of water relative to a reference point below the surface to which the vessel is connected by a riser, the method comprising:

making measurements of the velocity of the vessel to generate one or more velocity measurements;

making measurements of the angle of the riser adjacent to the reference point to generate one or more riser angle measurements;

providing to a filter the one or more velocity measurements and the one or more riser angle measurements as inputs to the filter; and combining the velocity measurements and the riser angle measurements using the filter to derive an estimate of an actual position of the vessel as an output from the filter.

2. The method according to claim 1, wherein the velocity measurements and the riser angle measurements are combined using a recursive algorithm that takes as inputs a velocity measurement, a riser angle measurement and an estimate of the position of the vessel at an earlier time.

3. The method according to claim 2, further comprising subtracting the estimated position of the vessel at the earlier time from an independent measurement of the position of the vessel at the earlier time to derive an error measurement, wherein the error measurement provides a further input to the recursive algorithm.

4. The method according to claim 2, wherein the recursive algorithm is a Kalman filter.

5. The method according to claim 1, wherein the velocity measurements are measurements of the velocity of the vessel relative to the water surrounding the vessel.

6. The method according to claim 1, wherein the velocity measurements are made using a Doppler log.

7. A method of dynamically positioning a vessel on the surface of water relative to a reference point below the surface to which the vessel is connected by a riser, the method comprising:

making measurements of the velocity of the vessel to generate one or more velocity measurements;

making measurements of the angle of the riser adjacent to the reference point to generate one or more riser angle measurements;

providing the one or more velocity measurements and the one or more riser angle measurements to a filter as inputs to the filter;

combining the velocity measurements and the riser angle measurements at the filter to derive an estimate of an actual position of the vessel as an output from the filter; and controlling one or more thrusters using the output from the filter to dynamically control the positioning of the vessel.

8. The method of dynamically positioning a vessel according to claim 7, wherein the control signals sent to the thrusters or measurements of the outputs of the thrusters are combined with the velocity measurements and the riser angle measurements to derive the estimate of the position of the vessel.

9. An apparatus for determining the position of a vessel on the surface of water relative to a reference point below the surface to which the vessel is connected by a riser, the apparatus comprising:

a first measurement system for measuring the velocity of the vessel;

second measurement system for measuring the angle of the riser adjacent to the reference point; and at least one filter for combining the velocity measurements and the riser angle measurements to derive an estimate of an actual position of the vessel.

10. The apparatus according to claim 9, wherein the first measurements system includes a Doppler log.

11. The apparatus according to claim 10, wherein the Doppler log is in water lock.

12. The method of dynamically positioning a vessel according to claim 7, further including:

taking measurements to determine a heading of the vessel; and controlling one or more thrusters to alter the heading of the vessel based on the output from the filter and the heading.

* * * * *

UNITED STATES PATENT AND TRADEMARK OFFICE
CERTIFICATE OF CORRECTION

PATENT NO. : 7,663,976 B2 Page 1 of 1
APPLICATION NO. : 11/710764
DATED : February 16, 2010
INVENTOR(S) : Richard I. Stephens It is certified that error appears in the above-identified patent and that said Letters Patent is hereby corrected as shown below:

In column 7, line 1, in Claim 9, delete "second" and insert -- a second --, therefor.

In column 7, line 7, in Claim 10, delete "measurements" and insert -- measurement --, therefor.

Signed and Sealed this

Fourth Day of May, 2010

David J. Kappos
*Director of the United States Patent and Trademark Office*